United States Patent
Lo et al.

(10) Patent No.: US 8,595,202 B2
(45) Date of Patent: Nov. 26, 2013

(54) METHOD AND SYSTEM FOR INTRA-DOCUMENT OBJECT LOCKING IN COLLABORATIVE AUTHORING

(75) Inventors: George Lo, Plainsboro, NJ (US); Ronald Lange, Fürth (DE)

(73) Assignee: Siemens Aktiengesellschaft, Munich (DE)

(*) Notice: Subject to any disclaimer, the term of this patent is extended or adjusted under 35 U.S.C. 154(b) by 1056 days.

(21) Appl. No.: 12/229,662

(22) Filed: Aug. 26, 2008

(65) Prior Publication Data

US 2009/0094242 A1    Apr. 9, 2009

Related U.S. Application Data

(60) Provisional application No. 60/977,207, filed on Oct. 3, 2007.

(51) Int. Cl.
    *G06F 7/00*         (2006.01)
(52) U.S. Cl.
    USPC .......................................... 707/704
(58) Field of Classification Search
    USPC .......................... 707/704; 711/152
    See application file for complete search history.

(56) References Cited

U.S. PATENT DOCUMENTS

| | | | |
|---|---|---|---|
| 5,339,389 A * | 8/1994 | Bates et al. .................. 715/742 |
| 5,454,108 A * | 9/1995 | Devarakonda et al. ....... 718/104 |
| 5,761,670 A * | 6/1998 | Joy ....................................... 1/1 |
| 6,336,134 B1 | 1/2002 | Varma | |
| 7,051,071 B2 | 5/2006 | Stewart et al. | |
| 7,233,951 B1 | 6/2007 | Gainer et al. | |
| 7,296,023 B2 | 11/2007 | Geyer et al. | |
| 7,370,269 B1 | 5/2008 | Prabhu et al. | |
| 7,587,558 B1 * | 9/2009 | Smith et al. ................... 711/152 |
| 2003/0187860 A1 * | 10/2003 | Holland ........................ 707/100 |
| 2004/0122897 A1 | 6/2004 | Seelemann et al. | |
| 2004/0181577 A1 | 9/2004 | Skurikhin et al. | |
| 2004/0225988 A1 * | 11/2004 | Petunin et al. .................. 716/11 |
| 2005/0086237 A1 * | 4/2005 | Monnie et al. ................ 707/100 |
| 2005/0097567 A1 * | 5/2005 | Monnie et al. ................ 719/315 |
| 2005/0198204 A1 | 9/2005 | Takahashi | |
| 2006/0004885 A1 * | 1/2006 | Lubashev et al. ............. 707/203 |
| 2006/0080432 A1 * | 4/2006 | Spataro et al. ................ 709/224 |
| 2006/0123065 A1 * | 6/2006 | Rapp ............................. 707/201 |
| 2008/0072238 A1 * | 3/2008 | Monnie et al. ................ 719/310 |
| 2008/0091777 A1 | 4/2008 | Carlos | |
| 2008/0243913 A1 * | 10/2008 | Suvernev et al. ......... 707/103 R |

OTHER PUBLICATIONS

Newman-Wolfe et al., "MACE: A Fine Grained Concurrent Editor", Proceedings of the Conference on Organizational Computing Systems, Atlanta, Nov. 5-8, 1991, vol. 12, No. 2,3, 5 Nov. 1991, pp. 240-254.

(Continued)

*Primary Examiner* — Hung T Vy

(57) ABSTRACT

A collaborative authoring system and method is disclosed. A collaboration server stores objects and applications open the objects stored on the collaboration server as documents. Collaborative authoring is enabled through a combination of coarse-grained server locks on objects stored in a collaboration server for short term server transactions and fine-grained application specific internal locks to lock portions of documents for authoring sessions. When an application begins an authoring session, an object stored in the collaboration server is opened as a document in an application, a server lock is applied to the object, internal locks are applied to portions of the document, and the server lock is removed from the object.

21 Claims, 6 Drawing Sheets

(56) References Cited

OTHER PUBLICATIONS

Prakash et al., "Distview: Support for Building Efficient Collaborative Applications Using Replicated Objects", CSCW. Proceedings of the Conference on Computer Supported Cooperative Work, Oct. 1, 1994, pp. 153-164.

Dewan et al., "Art editing-based characterization of the design space of collaborative applications", Database Inspec (Online) The Institution of Electrical Engineers, Stevenage, GB, 1994, Database accession No. 4833096.

Greenberg et al., "Real time groupware as a distributed system: concurrency control and its effect on the interface", Database Inspec (Online) The Institution of Electrical Engineers, Stevenage, GB, 1994, Database accession No. 5273687.

Munson et al., Concurrency control framework for collaborative systems', Database Compendex (Online) Engineering Information, Inc, New York, NY, retrieved from http://portal.acm.org/citation.cfm?doid=240080.240302.

Wiil et al., "Concurrency control in collaborative hypertext systems", Database Inspec (Online) The Institution of Electrical Engineers, Stevenage, GB, 1993, Database accession No. 5009643.

Sun et al., "Transparent adaptation of single-user applications for multi-user real-time collaboration", Database Inspec (Online) The Institution of Electrical Engineers, Stevenage, GB, Dec. 2006, Database accession No. 9353827.

Chan et al., "Real-time collaborative design of complex objects on the web", Systems, Man, and Cybernetics, 1999, IEEE SMC '99 Conference Proceedings, IEEE Int'l Conference on Tokyo, Japan, Oct. 12-15, 1999, IEEE, Piscataway, NJ, vol. 2, Oct. 12, 1999, pp. 120-125.

European Search Report including European Search Opinion.

* cited by examiner

METHOD AND SYSTEM FOR INTRA-DOCUMENT OBJECT LOCKING IN COLLABORATIVE AUTHORING

This application claims the benefit of U.S. Provisional Application No. 60/977,207, filed Oct. 3, 2007, the disclosure of which is herein incorporated by reference.

BACKGROUND OF THE INVENTION

The present invention relates to collaborative authoring using software applications, and more particularly, to fine-grained intra-document object locking in collaborative authoring.

Collaborative authoring refers to multiple users using software applications to author or edit a common project or document. Some software applications, such as common word processing and spreadsheet applications, typically support a single user, such that each user uses a separate instance of the application. Other software applications (e.g., SIMATIC STEP7) support cooperative work on the same data or project, typically for 2-10 users at a time. For a larger number of users, a collaboration server is commonly used to support collaborative authoring. A collaboration server is typically implemented using specific software that manages projects or documents to prevent inconsistent changes to the projects or documents by different users or software applications.

FIG. 1 illustrates a conventional collaboration server system. As illustrated in FIG. 1, a collaboration server 102 typically stores documents associated with various types of applications 104, 106, and 108 as objects 110 and 112. Applications 104 and 106 are different versions of the same type of application (type A), and application 108 is a different type of application (type B). In FIG. 1, each of the applications 104, 106, and 108 supports multiple users. Each type of application typically has a fine-grained tightly coupled object model, which represents documents for that type of application. The complete object model or document of an application is modeled as an object, such as a Binary Large Object (BLOB), in the collaboration server. In FIG. 1, object 110 represents a document associated with application A and object 112 represents a document associated with application B. Accordingly, object 110 can be opened as a document in applications 104 and 106, and object 112 can be opened as a different type of document in application 108. The collaboration server 102 typically has administrative/generic applications 114, which allow for browsing and organization of objects 110 and 112 on the collaboration server 102.

Since each object 110 and 112 on the collaboration server 102 represents a complete object model or document, the granularity in the collaboration server 102 is the whole document. Accordingly, when an application authors or edits a document, the object representing the entire document is locked at the collaboration server 102. When an object is locked at the collaboration server 102, other applications may read the corresponding document, but cannot edit or author the document. For example, if object 110 is locked by application 104, users 1-3 can edit the corresponding document using application 104, but users 4-6 have no write access to the document. Thus, since the whole object is locked, the possibility of concurrent authoring is significantly reduced.

One solution to allow additional concurrent authoring is to model sub-objects within a document as individual objects in the collaboration server. In this case, each object (BLOB) in the collaboration server represents a document that is a portion of an overall document associated with an application type. Each object is locked at the collaboration server when the corresponding document portion is being edited by an application. This improves the granularity in the collaboration server to predetermined document portions. However, the granularity of the document portions is not variable, and concurrent authoring of a document portion by multiple applications may still be inefficient. Furthermore, exposing the complete object model to the collaboration server typically results in performance penalties, as well as the risk of object model inconsistencies. This happens especially when other applications or the administrative/generic applications modify the data in the collaboration server at the same time.

Another possible solution to allow additional concurrent authoring is to allow various applications to author and edit a common document with no locks. In this case, when an application writes data back to the collaboration server, a comparison and conflict detection is performed to detect any conflicts between versions of a document. However, detected conflicts typically require user interaction to resolve, making this solution inefficient.

BRIEF SUMMARY OF THE INVENTION

The present invention provides a method and system for collaborative authoring using fine-grained intra-document object locking. Embodiments of the present invention allow for increased concurrent authoring of documents through a combination of coarse-grained server locks on objects stored in a collaboration server for short term server transactions and fine-grained application specific internal locks to lock portions of documents for authoring sessions. Embodiments of the present invention also provide intra-document object locking having a variable granularity.

In one embodiment of the present invention, an object stored in a collaboration server is opened as a document in an application. A server lock is then applied to the object. Internal locks are applied to portions of the document in the application and those portions, including the internal locks, are written back to the object in the collaboration server. The server lock is then removed from the object. This begins an authoring session, in which the application can author or modify the portions of the document locked with the internal locks. After the application modifies the locked portions of the document, a server lock is applied to the object stored in the collaboration server, the internal locks are removed from the portions of the document, and the modified portions of the document are written back to the object in the collaboration server. The server lock is then removed from the object in the collaboration server.

According to another embodiment of the present invention, a collaboration server stores objects and enforces server locks applied to the objects. When a server lock is applied to an object by an application, the collaboration server only allows the application that applied the server lock to have write access to the object. Multiple client applications can open the objects stored in the collaboration server as documents. Each client application can apply internal locks to portions of the documents in order to lock the document portions for an authoring session. When an application locks portions of a document for an authoring session using internal locks, and the locked portions, including the internal locks are written back to the object in the server, the server lock is removed from the object in the collaboration server corresponding to the document to allow other applications to concurrently author other portions of the document.

These and other advantages of the invention will be apparent to those of ordinary skill in the art by reference to the following detailed description and the accompanying drawings.

DETAILED DESCRIPTION

The present invention is directed to a system and method for collaborative authoring. Embodiments of the present invention utilize fine-grained intra-document object locking to lock portions of a document in order to allow multiple users or applications to, concurrently edit or author the same document. The locked portions within a document do not have to be pre-determined and can have variable granularity. Server locks are used to temporarily lock entire documents for short-term server transactions.

Figure 1:
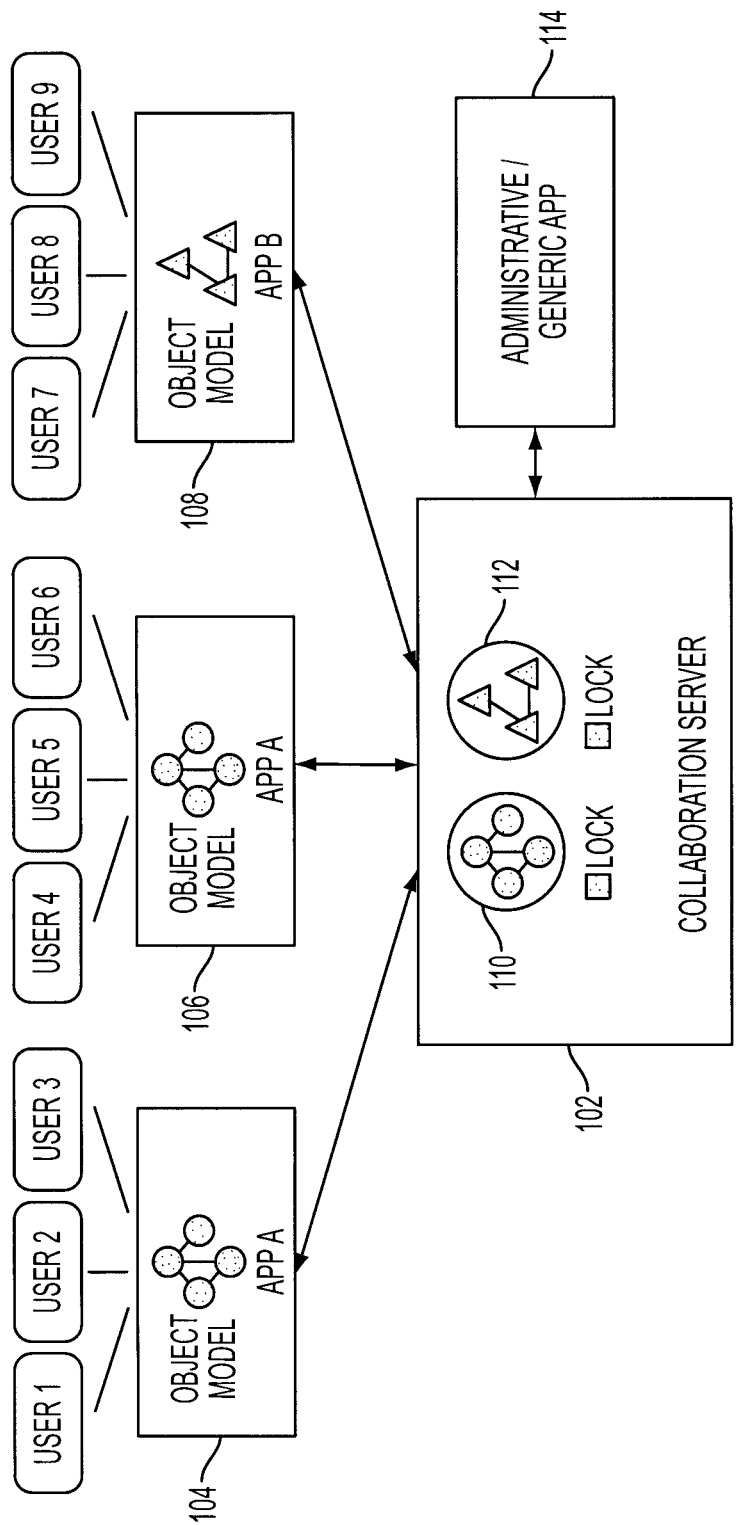
FIG. 1 illustrates a conventional collaboration server system.
Figure 2:
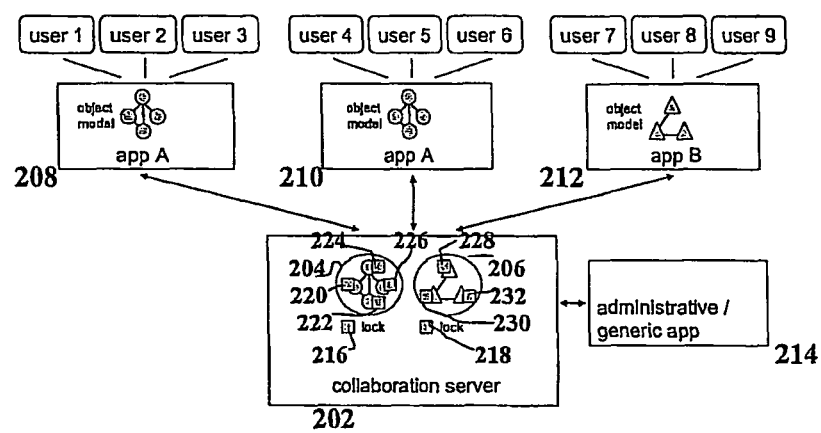
FIG. 2 illustrates a collaborative authoring system according to an embodiment of the present invention.

FIG. 2 illustrates a collaborative authoring system according to an embodiment of the present invention. As illustrated in FIG. 2, a collaboration server 202 stores various objects 204 and 206. For example, the objects 204 and 206 stored on the collaboration server 202 can be Binary Larger Objects (BLOBs). Each of the objects 204 and 206 stored on the collaboration server 202 represents a document that is associated with a particular type of application. In FIG. 2, applications 208, 210, and 212 communicate with the collaboration server 202, and each application 208, 210, and 212 supports multiple users. Applications 208 and 210 are the same type of application (app A) and application 212 is a different type of application (app B). Each type of application has an associated object model that is used to construct a document associated with that type of application. The objects 204 and 206 stored in the collaboration server 202 can only be opened as documents in a compatible type of application. Object 204 is associated with application type A, and can be opened as document in applications 208 and 210. Object 206 is associated with application type B, and can be opened as a document in application 212. The collaboration server 202 has administrative/generic applications 214, which allow for browsing and organization of objects 204 and 206 on the collaboration server 202. As used herein the term object refers to an object, such as a BLOB, stored on the collaboration server. The term document refers to an object that is opened in an application. It is to be understood that the term document does not refer to any specific type of application, and does not limit the present invention to a particular types of applications.

The system of FIG. 2 facilitates collaborative authoring by using a combination of server locks 216 and 218 and application specific internal locks 220, 222, 224, 226, 228, 230, and 232. A Server lock is applied to an object stored on the collaboration server 202 to lock the entire object. For example, server lock 216 can be applied to object 204 to lock object 204 and server lock 218 can be applied to object 206 to lock object 206. When an object is locked, the application that has applied the server lock to that object can edit or write to the corresponding document. All other applications can view the corresponding document, but cannot edit or write to the document or store any changes to the document in the object on the collaboration server 202. An internal lock is applied to a portion within a document to lock that portion of the document. For example, internal locks 220, 222, 224, and 226 lock internal portions of the document represented by object 204 and internal locks 228, 230, and 232 lock internal portions of the document represented by object 206. The document portions locked by internal locks can have a variable granularity, and the size of the document portions can be set automatically or manually by a user using the application. When a document portion is locked by an internal lock, the locked document portion cannot be edited by another application, even when the rest of the document can be edited by other applications (i.e., no server lock is applied to the object).

Figure 3:
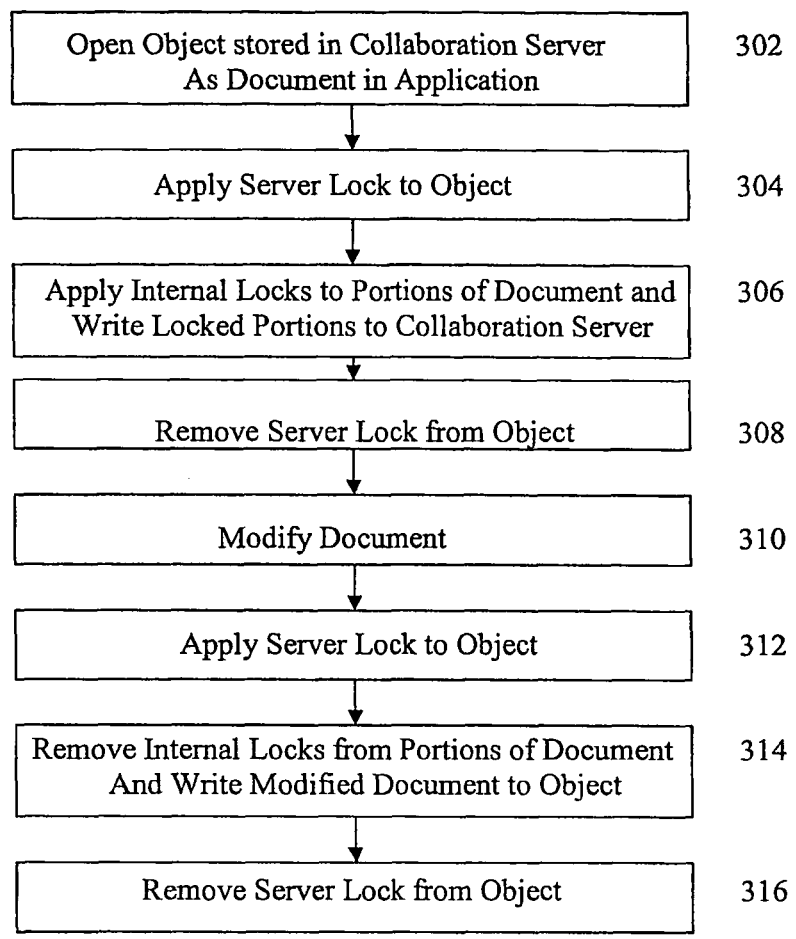
FIG. 3 illustrates a method of editing a document using a collaborative authoring system according to an embodiment of the present invention.

FIG. 3 illustrates a method of editing a document using a collaborative authoring system according to an embodiment of the present invention. It is to be understood that the method of FIG. 3 provides an overview of a collaborative authoring method, and the method steps of FIG. 3 can be implemented using the methods illustrated in FIGS. 4 and 5. As illustrated in FIG. 3, at step 302, an object stored on the collaboration server is opened as a document in an application. At step 304, a server lock is applied to the object stored on the collaboration server. When the server lock is applied to the object, the object is locked such that only the application that has opened the corresponding document can edit or author that document. Other applications may be able view the document when the object is locked, but cannot store any changes made to the object while the object is locked. At step 306, internal locks are applied to portions of the document, and the locked portions of the document are written back to the object in the collaboration server. At step 308, the server lock is removed from the object stored on the collaboration server. Accordingly, other applications can edit or author the document at the same time as the application in which the document is already opened. However, because the internal locks have been applied to specific portions of the document, those portions cannot be edited by the other applications.

At step 310, the document is modified by the application. In particular, the application only modifies the portions of the document that are locked by the internal locks. At step 312, a server lock is applied to the object stored on the collaboration server. At step 314, the internal locks are removed from the portions of the document and the modified document is written to the corresponding object in the collaboration server. At step 316, the server lock is removed from the object in the collaboration server. At this point, the modifications are stored in the object in the collaboration server, and the entire document, including the modified portions, is available to all applications.

Figure 4:
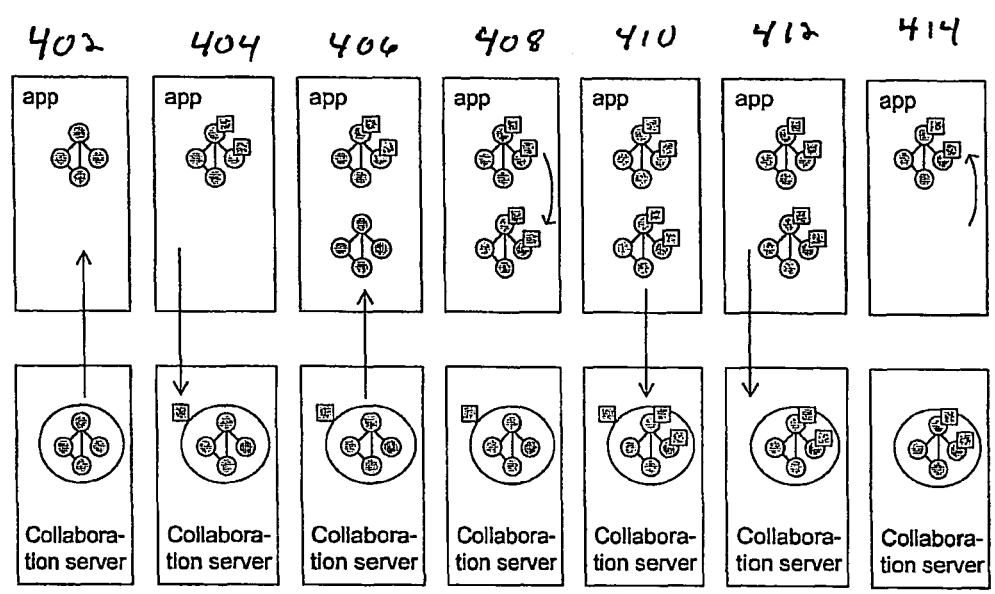
FIG. 4 illustrates the application of internal locks to portions of a document according to an embodiment of the present invention.

FIG. 4 illustrates the application of internal locks to portions of a document according to an embodiment of the present invention. FIG. 4 shows a method for implementing steps 302-308 of FIG. 3 in greater detail. As illustrated in FIG. 4, at step 402, an object stored on the collaboration server is opened as a document in an application. A user can select a document for authoring or editing. For example, the document can be selected using a browser. The application opens the corresponding BLOB in the collaboration server as a working document. At this point, other applications (users) may have full access to the same BLOB in the collaboration server.

At step 404, the application determines which document portions need to be locked for the authoring session and then applies a server lock to the BLOB in the collaboration server. Internal locks are applied to the document portions determined for the authoring session. The application can determine the document portions to be locked implicitly or explicitly. For example, the application can determine the document portions to be locked implicitly by automatically detecting a portion of document on which a user begins working and locking that portion of the document. The document portions to be locked can be determined explicitly by a user manually selecting portions of the document to be locked. This allows variable granularity in the locked document portions, since a user can select portions of various size to be locked. When the application applies a server lock to the BLOB in the collaboration server, other applications may only access the BLOB in read-only mode.

At step 406, the BLOB stored on the collaboration server is opened as a temporary document in the application. Since the BLOB may have been modified since the working document was opened, the BLOB is reloaded as a temporary document to ensure it contains the most recent modifications. Accordingly, the temporary document may contain modifications from other client applications that need to be preserved. It is possible that another application could have locked the same portions of the document that this application is trying to lock. In this case, these portions cannot be edited because they are already locked by another application.

At step 408, the internal locks in the working document are copied to the temporary document. At this point, the temporary document includes the most recent modifications and the internal locks for the current authoring session.

At step 410, the temporary document including the internal lock information is written back to the BLOB in the collaboration server. When the temporary document is written back to the BOLB in the collaboration server, the BLOB includes the internal locks applied by the application to the portions of the document.

At step 412, the server lock is removed from the BLOB in the collaboration server. From this point on, other client applications may have full access to the BLOB. Since the internal lock information is included in the BLOB, when another client application opens the BLOB as a document, the other client application will be prevented from modifying the portions of the document locked by the internal locks. Accordingly, the internal locks applied by the application protect the portions of the document that are being modified by the application in the current authoring session.

At step 414, the newly locked document portions in the working document are updated with recent data from corresponding portions of the temporary document. This preserves modification made by other client applications that are contained in the temporary document. The temporary document is then closed, and a user can use the application to modify the locked portions of the working document.

During the course of an authoring session, additional portions of the document may need to be locked. This can be achieved by repeating steps 404-414 for each additional document portion to be locked. Accordingly, other than the internal locks, no data is written back to the BLOB in the collaboration server while the authoring session is active.

Figure 5:
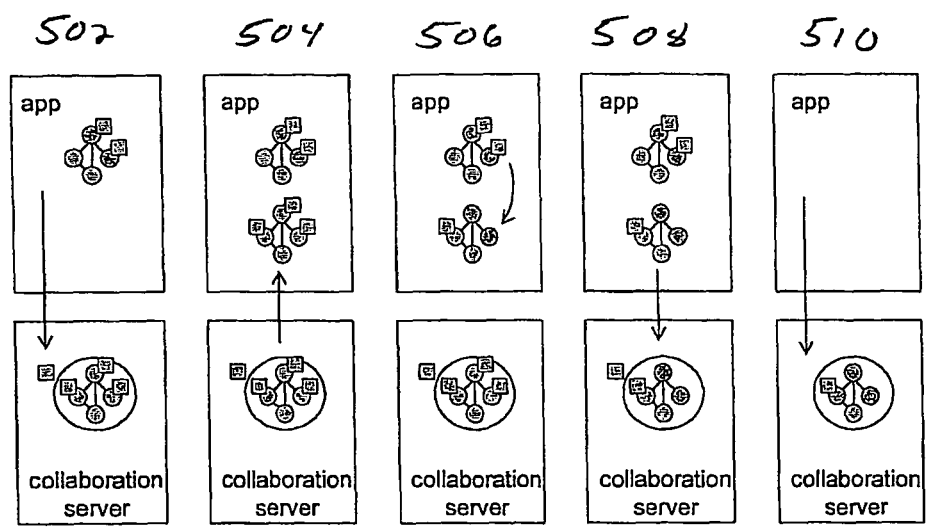
FIG. 5 illustrates writing document modifications back to the collaboration server according to an embodiment of the present invention.

After an authoring session is completed, the modifications resulting from the authoring session need to be written back to the corresponding BLOB in the collaboration server. FIG. 5 illustrates writing document modifications back to the collaboration server according to an embodiment of the present invention. FIG. 5 shows a method for implementing steps 312-316 of FIG. 3 in greater detail. As illustrated in FIG. 5, at step 502, when the application is ready to end the authoring session, a server lock is applied to the corresponding BLOB in the collaboration server.

At step 504, the application opens the BLOB as a temporary document. Since other client applications can modify the document concurrently while the current authoring session in progress, the temporary document may contain modifications from other client applications that need to be preserved. The temporary document may also contain internal locks applied to portions of the document (other than the portions locked by the current application) by another client application.

At step 506, the modifications of the locked portions of the working document made during the authoring session are copied to the temporary document and the internal locks applied to the document portions for the authoring session are removed. At this point, the temporary document includes the modifications from the current authoring session, as well as any other modifications made by other client applications concurrently to the current authoring session. The temporary document may also include internal locks applied by other client applications.

At step 508, the updated temporary document is written back to the corresponding BLOB in the collaboration server.

At step 510, the server lock is removed from the BLOB in the collaboration server, and both the working document and the temporary document in the application are closed. At this point, the authoring session is over, any client application can have full access to the BLOB stored in the collaboration server, and the document portions locked by the internal locks are unlocked and can be modified by another client application.

As described above, the internal locks on portions of a document are stored in the BLOB corresponding to that document. According to an alternative implementation, internal locks on document portions can be stored in the collaboration server in a second lock-BLOB that is associated with the BLOB corresponding to a document. When a BLOB is opened as a document in an application, the associated lock-BLOB is also loaded to identify which portions of the document are locked with internal locks. In order to set internal locks on portions of the document, only the lock-BLOB needs to be loaded. This avoids writing the whole BLOB corresponding to the document just to set an internal lock. Performance can be improved since the lock-BLOB can be considerably smaller than the document BLOBS.

In the examples described above, for simplicity sake, the entire object model of a document is contained in one BLOB which is opened as a corresponding document. In practice, however, in any one authoring session, a client application may work on a small part of a project (e.g., a sub-hierarchy of a hierarchical object model). From performance and concurrency standpoints, it may be effective to break a project into smaller parts with each part contained in a separate BLOB. The relations between main parts of the project can be modeled as relations between the BLOBs in the collaboration server. Depending on the scope of the authoring task, the authoring client application may load one or more BLOBs at the same time in order to build the necessary object model for authoring. In this case, internal locks may be applied to document portions of separate documents corresponding to the loaded BLOBs.

When only a partial object model is loaded in an authoring application, performance may become an issue if a reference count of a referenced document portion needs to be modified but that document portion is outside the partial model (document) being authored. Instead of reading and writing the entire BLOB containing the referenced document portion just to change its reference count, the information can be written to the lock-BLOB associated with the BLOB containing the referenced document portion. The changes can then be processed the next time that BLOB is opened for authoring.

A document portion locked for editing with an internal lock may reference another portion of the same or a different document. If references are counted, then no additional mechanism is necessary. Any client application may apply a lock and modify a document portion (or property of the document portion) whose reference count is not zero as long as the modifications do not break or invalidate any reference to that document portion. If references are not counted, then the client applying an internal lock to a document portion with a reference to another document portion must also apply a "soft" lock to the referenced document portion. Unlike a normally locked document portion that may not be modified by another client application, a soft locked document portion may be locked and modified by another client application as long as that client application does not break any reference to that object.

When an application crashes after storing internal locks, these locks need to be removed. This can be done manually by an operator. Alternatively, a possible enhancement to the methods described above can be used to implement an automatic method that leverages functionality typically available in collaboration servers. The enhancement can be achieved by binding the lifetime of internal locks to the lifetime of server locks on the corresponding object in the collaboration server. This can be implemented by setting an application session id (GUID) in addition to setting a lock flag for an internal lock on a document portion. For each active application session id, the client application creates a "session"-object in the collaboration server and locks the "session"-object with a server lock. In this case, an internal lock on a document portion is only valid if the application session id specified for the internal lock also references a server "session-"object that is locked with a server lock. This allows the internal locks in a document to rely on the expiration mechanisms of the collaboration server instead without the need for separate expiration mechanisms for the internal locks.

This enhancement can be extended to allow "persistent" internal locks, which are internal locks that survive in an authoring session for long-time checkouts. Instead of server objects corresponding to application sessions, server objects corresponding to users or applications holding the persistent internal locks can be associated with the internal locks. In this case, internal locks on document portions survive for a certain amount of time, even if the application that locked the document portions is disconnected from the collaboration server.

Figure 6:
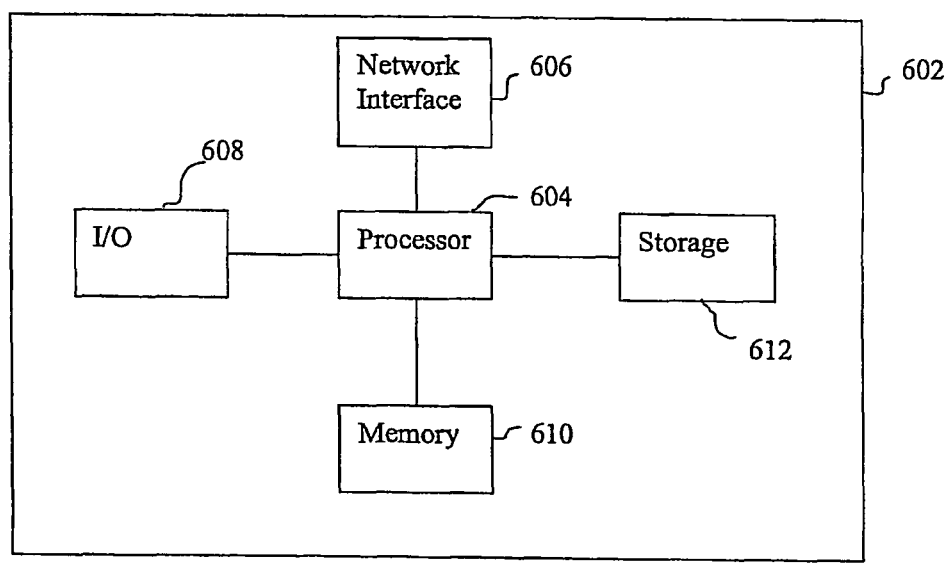
FIG. 6 is a high level block diagram of a computer capable of implementing the present invention.

The collaboration server and applications, as well as the above-described collaborative authoring methods, may be implemented on a computer or network of computers using well-known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the method steps of FIGS. 3, 4, and 5 can be implemented by computer program instructions stored in the memory 610 and/or storage 612 and controlled by the processor 604 executing the computer program instructions. Furthermore, the collaboration server and the applications may also be implemented using computer program instructions stored in the memory 610 and/or storage 612 and controlled by the processor 604 executing the computer program instructions. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for enabling collaborative authoring of a document stored as an object on a collaboration server by one or more applications, comprising:
    opening an object stored on a collaboration server as a document in an application;
    applying a server lock to said object;
    applying internal locks to portions of the document while said object is locked with the server lock;
    removing said server lock from said object;
    modifying said portions of the document in said application;
    re-applying the server lock to said object;
    removing said internal locks from said portions of the document;
    writing the modified portions of the document back to said object in the collaboration server; and
    removing said server lock from said object.

2. The method of claim 1, wherein said step of applying internal locks to portions of the document comprises:
    applying the internal locks to said portions of the document;
    opening said object as a temporary document in said application after applying the server lock to said object;
    copying said the internal locks in said document to said temporary document;
    writing said temporary document including said internal locks to said object store on the collaboration server; and
    updating said portions of the document with corresponding portions of said temporary document.

3. The method of claim 2, wherein said temporary document includes modifications from another application made after said object was opened as said document in said application.

4. The method of claim 1, wherein said step of writing the modified portions of the document back to said object in the collaboration server comprises:

opening said object as a temporary document in said application after applying the server lock to said object;
updating said temporary document with the modified portions of said document; and
writing said temporary document back to said object in the collaboration server.

5. The method of claim 4, wherein said temporary document includes modifications made after said internal locks were applied to said portions of the document.

6. The method of claim 1, wherein said object is a Binary Large Object (BLOB).

7. The method of claim 1, wherein said step of applying internal locks to portions of the document comprises:
loading a lock-object stored in the collaboration server and associated with said object; and
storing information regarding said internal locks in said lock-object.

8. The method of claim 1, further comprising:
determining that said portions of the document reference other document portions of another document; and
applying a soft-lock to said other document portions of another document for a duration of the internal locks applied to said portions of the document.

9. An apparatus for enabling collaborative authoring of a document stored as an object on a collaboration server by one or more applications, comprising:
means for opening an object stored on a collaboration server as a document in an application;
means for applying a server lock to said object;
means for applying internal locks to portions of the document while said object is locked with the server lock;
means for removing said server lock from said object;
means for modifying said portions of the document in said application;
means for re-applying said server lock to said object;
means for removing said internal locks from said portions of the document;
means for writing the modified portions of the document back to said object in the collaboration server; and
means for removing said server lock from said object.

10. The apparatus of claim 9, wherein said means for applying internal locks to portions of the document comprises:
means for applying the internal locks to said portions of the document;
means for opening said object as a temporary document in said application after applying the server lock to said object;
means for copying said the internal locks in said document to said temporary document;
means for writing said temporary document including said internal locks to said object store on the collaboration server; and
means for updating said portions of the document with corresponding portions of said temporary document.

11. The apparatus of claim 9, wherein said means for writing the modified portions of the document back to said object in the collaboration server comprises:
means for opening said object as a temporary document in said application after applying the server lock to said object;
means for updating said temporary document with the modified portions of said document; and
means for writing said temporary document back to said object in the collaboration server.

12. The apparatus of claim 9, wherein said means for applying internal locks to portions of the document comprises:
means for loading a lock-object stored in the collaboration server and associated with said object; and
means for storing information regarding said internal locks in said lock-object.

13. The apparatus of claim 9, further comprising:
means for determining that said portions of the document reference other document portions of another document; and
means for applying a soft-lock to said other document portions of another document for a duration of the internal locks applied to said portions of the document.

14. A non-transitory computer readable medium encoded with computer executable instructions for enabling collaborative authoring of a document stored as an object on a collaboration server by one or more applications, the computer executable instructions defining steps comprising:
opening an object stored on a collaboration server as a document in an application;
applying a server lock to said object;
applying internal locks to portions of the document while said object is locked with the server lock;
removing said server lock from said object;
modifying said portions of the document in said application;
re-applying said server lock to said object;
removing said internal locks from said portions of the document;
writing the modified portions of the document back to said object in the collaboration server; and
removing said server lock from said object.

15. The computer readable medium of claim 14, wherein the computer executable instructions defining the step of applying internal locks to portions of the document comprise computer executable instructions defining the steps of:
applying the internal locks to said portions of the document;
opening said object as a temporary document in said application after applying the server lock to said object;
copying said the internal locks in said document to said temporary document;
writing said temporary document including said internal locks to said object store on the collaboration server; and
updating said portions of the document with corresponding portions of said temporary document.

16. The computer readable medium of claim 14, wherein the computer executable instructions defining the step of writing the modified portions of the document back to said object in the collaboration server comprise computer executable instructions defining the steps of:
opening said object as a temporary document in said application after applying the server lock to said object;
updating said temporary document with the modified portions of said document; and
writing said temporary document back to said object in the collaboration server.

17. The computer readable medium of claim 14, wherein the computer executable instructions defining the step of applying internal locks to portions of the document comprise computer executable instructions defining the steps of:
loading a lock-object stored in the collaboration server and associated with said object; and
storing information regarding said internal locks in said lock-object.

18. The computer readable medium of claim 14, further comprising computer executable instructions defining the steps of:

determining that said portions of the document reference other document portions of another document; and applying a soft-lock to said other document portions of another document for a duration of the internal locks applied to said portions of the document.

19. A collaborative authoring system, comprising:

a collaboration server configured to store objects and configured to enforce server locks applied to stored objects, such that when a server lock is applied to an object by an application, the collaboration server only allows the application that applied the server lock to have write access to the object; and a plurality of client applications, each application configured to open objects stored in the collaboration server as documents in the application, and apply internal locks to portions of the documents opened in the application for an authoring session on the locked portions of the documents, wherein when portions of a document are locked with internal locks for an authoring session in an application, the server lock is removed from the object in the collaboration server corresponding to the document to allow other applications to author other portions of the document.

20. The collaborative authoring system of claim 19, wherein the objects are stored in the collaboration server as Binary Large Objects (BLOBs).

21. The collaborative authoring system of claim 19, wherein each of the client applications is configured to apply internal locks to document portions having variable granularity.

\* \* \* \* \*